United States Patent
Thomas

(10) Patent No.: US 12,544,390 B2
(45) Date of Patent: Feb. 10, 2026

(54) METHODS TO REFINE CANNABINOIDS

(71) Applicant: NATURAL EXTRACTION SYSTEMS, LLC, Boulder, CO (US)

(72) Inventor: C. Russell Thomas, Boulder, CO (US)

(73) Assignee: Natural Extraction Systems, LLC, Boulder, CO (US)

( * ) Notice: Subject to any disclaimer, the term of this patent is extended or adjusted under 35 U.S.C. 154(b) by 609 days.

(21) Appl. No.: 17/798,033

(22) PCT Filed: Feb. 6, 2021

(86) PCT No.: PCT/US2021/016976
§ 371 (c)(1),
(2) Date: Aug. 5, 2022

(87) PCT Pub. No.: WO2021/159038
PCT Pub. Date: Aug. 12, 2021

(65) Prior Publication Data
US 2023/0101492 A1 Mar. 30, 2023

Related U.S. Application Data
(60) Provisional application No. 62/971,742, filed on Feb. 7, 2020.

(51) Int. Cl.
*A61K 31/05* (2006.01)
*A61K 31/352* (2006.01)
*A61K 36/185* (2006.01)

(52) U.S. Cl.
CPC ............ *A61K 31/05* (2013.01); *A61K 31/352* (2013.01); *A61K 36/185* (2013.01); *A61K 2236/00* (2013.01)

(58) Field of Classification Search
CPC ...................................................... A61K 31/05
See application file for complete search history.

(56) References Cited

U.S. PATENT DOCUMENTS

| | | | |
|---|---|---|---|
| 2,467,435 A | 4/1949 | Langhurst |
| 2,805,981 A | 9/1957 | Cavin |
| 3,270,437 A | 9/1966 | Lara |
| 4,227,997 A | 10/1980 | Shaddock |
| 4,279,824 A | 7/1981 | McKinney |
| 4,396,487 A | 8/1983 | Strumskis |
| 4,752,307 A | 6/1988 | Asmus |
| 5,002,784 A | 3/1991 | Paré |
| 5,026,549 A | 6/1991 | Coutiere |
| 5,235,992 A | 8/1993 | Sensabaugh, Jr. |
| 5,408,924 A | 4/1995 | Arendt |
| 5,458,897 A | 10/1995 | Paré |
| 6,019,819 A | 2/2000 | Williams |
| 6,248,910 B1 | 6/2001 | Franke |
| 6,365,416 B1 | 4/2002 | Elsohy |
| 6,403,126 B1 | 6/2002 | Webster |
| 6,860,998 B1 | 3/2005 | Wilde |
| 7,001,502 B1 | 2/2006 | Satchwell |
| 7,001,629 B1 | 2/2006 | Mengal |
| 7,344,736 B2 | 3/2008 | Whittle |
| 7,622,140 B2 | 11/2009 | Whittle |
| 7,833,298 B2 | 11/2010 | Larnholm |
| 8,062,410 B2 | 11/2011 | Bullinger |
| 8,329,229 B2 | 12/2012 | Gonzalez |
| 8,343,553 B2 | 1/2013 | Hospodor |
| 8,445,034 B1 | 5/2013 | Coles, Jr. |
| 9,038,413 B2 | 5/2015 | Howard |
| 9,987,567 B1 | 6/2018 | Ko |
| 10,159,908 B2 | 12/2018 | Thomas |
| 10,195,159 B2 | 2/2019 | Whittle |
| 10,238,705 B2 | 3/2019 | Speier |
| 10,413,843 B2 | 9/2019 | Ko |
| 10,456,708 B2 | 10/2019 | Thomas |
| 10,596,486 B2 | 3/2020 | Nevitt |
| 10,617,974 B2 | 4/2020 | Thomas |
| 10,669,248 B2 | 6/2020 | Thomas |
| 10,806,707 B2 | 10/2020 | Finley |
| 10,822,320 B2 | 11/2020 | Thomas |
| 10,881,982 B2 | 1/2021 | Thomas |
| 11,643,402 B2 | 5/2023 | Thomas |
| 11,702,397 B2 | 7/2023 | Thomas |
| 12,297,181 B2 | 5/2025 | Thomas |
| 2002/0139097 A1 | 10/2002 | Brilmaker |
| 2004/0049059 A1 | 3/2004 | Mueller |
| 2004/0147767 A1 | 7/2004 | Whittle |

(Continued)

FOREIGN PATENT DOCUMENTS

| | | |
|---|---|---|
| CA | 2472561 A1 | 8/2002 |
| CN | 201643760 U | 11/2010 |

(Continued)

OTHER PUBLICATIONS

Benmoussa, H. et al., "Enhanced solvent-free microwave extraction of Foeniculum vulgare Mill. essential oil seeds using double walled reactor," Arabian Journal of Chemistry, 2016, vol. 12, pp. 3863-3870.

Filly, A et al., "Solvent-free microwave extraction of essential oil from aromatic herbs: From laboratory pilot industrial scale," Food Chemistry, 2013, vol. 150, pp. 193-198.

Kanter et al., "Qualitative determination of delta9-tetrahydrocannabinol and delta9-tetrahydrocannabinolic acid in marihuana by high-pressure liquid chromatography" Journal of Chromatography, 1979, vol. 171, pp. 504-508.

Petrov, V.M. et al., "Microwave absorbing materials," Inorganic Materials, 2001, vol. 37, issue 2, pp. 93-98.

(Continued)

Primary Examiner — Paul V Ward
(74) Attorney, Agent, or Firm — Douglas G. Metcalf

(57) ABSTRACT

This disclosure generally relates to gas-phase methods to simultaneously purify and decarboxylate cannabinoids in about two seconds, which are about 100-10,000 times more efficient than conventional purification and decarboxylation strategies. The methods also recover thermolabile cannabinoids such as cannabigerol at significantly higher yields than conventional methods.

22 Claims, No Drawings

(56) References Cited

U.S. PATENT DOCUMENTS

| | | |
|---|---|---|
| 2004/0147769 A1 | 7/2004 | Davis |
| 2004/0187340 A1 | 9/2004 | Chemat |
| 2005/0042172 A1 | 2/2005 | Whittle |
| 2005/0172802 A1 | 8/2005 | Betting |
| 2009/0054711 A1 | 2/2009 | Lawrence |
| 2010/0119606 A1 | 5/2010 | Whittle |
| 2011/0133120 A1 | 6/2011 | McGhee |
| 2012/0012002 A1 | 1/2012 | Kaneko |
| 2012/0157719 A1 | 6/2012 | Teles |
| 2013/0240347 A1 | 9/2013 | Hackleman |
| 2014/0001027 A1 | 1/2014 | Balass |
| 2014/0113010 A1 | 4/2014 | Hospodor |
| 2014/0193303 A1 | 7/2014 | Ellis |
| 2014/0271940 A1 | 9/2014 | Wurzer |
| 2015/0068113 A1 | 3/2015 | Conner |
| 2015/0252286 A1 | 9/2015 | Scialdone |
| 2016/0038437 A1 | 2/2016 | Whittle |
| 2016/0053199 A1 | 2/2016 | Clodoveo |
| 2016/0228385 A1 | 8/2016 | Sievers |
| 2018/0000857 A1 | 1/2018 | Kotra |
| 2018/0078874 A1 | 3/2018 | Thomas |
| 2018/0125777 A1 | 5/2018 | Lindsay |
| 2018/0296617 A1 | 10/2018 | Rivas |
| 2019/0151171 A1 | 5/2019 | Johnson |
| 2020/0390838 A1 | 12/2020 | Kotra |
| 2023/0101492 A1 | 3/2023 | Thomas |
| 2023/0312502 A1 | 10/2023 | Thomas |
| 2024/0092752 A1 | 3/2024 | Thomas |

FOREIGN PATENT DOCUMENTS

| | | |
|---|---|---|
| CN | 101553702 B | 6/2012 |
| CN | 103357193 A | 10/2013 |
| CN | 105943615 A | 9/2016 |
| EP | 2644039 A1 | 10/2013 |
| EP | 3453397 A1 | 3/2019 |
| FR | 2742358 A1 | 6/1997 |
| GB | 635121 | 4/1950 |
| GB | 2372714 A | 9/2002 |
| GB | 2400320 A | 10/2004 |
| JP | 4388715 B2 | 11/2002 |
| JP | 4849578 B1 | 1/2012 |
| WO | 2002089945 A2 | 11/2002 |
| WO | 2014000077 A1 | 1/2014 |
| WO | 2015049585 A2 | 4/2015 |
| WO | 2015070167 A1 | 5/2015 |
| WO | 2016153347 A1 | 9/2016 |
| WO | 2016161420 A1 | 10/2016 |
| WO | 2017192527 A1 | 11/2017 |
| WO | 2018009514 A1 | 1/2018 |
| WO | 2018047190 A1 | 3/2018 |
| WO | 2018102711 A1 | 6/2018 |
| WO | 2019082187 A1 | 5/2019 |

OTHER PUBLICATIONS

Veress et al., "Determination of cannabinoid acids by high-performance liquid chromatography of their neutral derivatives formed by thermal decarboxylation: I. Study of the decarboxylation process in open reactors," Journal of Chromatography, 1990, vol. 520, pp. 339-347.

Wang, Z. et al., "Improved solvent-free microwave extraction of essential oil from dried *Cuminum cyminum* L. and Zanthoxylum bungeanum Maxim," Journal of Chromatography A, 2006, vol. 1102, pp. 11-17.

Koturević et al., "Rapid Method for the Extraction of Cannabionoids from Cannabis sativa Using Microwave Heating Technique," Journal of Criminalistics and Law, 2014, vol. 3, pp. 109-123.

METHODS TO REFINE CANNABINOIDS

CROSS-REFERENCE TO RELATED APPLICATIONS

This patent application is the United States National Phase under 35 U.S.C. § 371 of International Application No. PCT/US2021/016976, filed Feb. 6, 2021, which claims priority to U.S. Provisional Patent Application No. 62/971,742, filed Feb. 7, 2020, each of which is incorporated by reference in its entirety.

BACKGROUND

Industrial hemp contains cannabinoid carboxylic acids that can be decarboxylated and purified to produce refined cannabinoid products. The legitimate industry that manufactures cannabinoids at scale is nascent, and methods to decarboxylate and purify cannabinoids that display economies of scale are desirable.

SUMMARY

This disclosure generally relates to gas-phase methods to simultaneously purify and decarboxylate cannabinoids in about 2 seconds, which is about 100-10,000 times more efficient than conventional purification and decarboxylation strategies. The methods also recover thermolabile cannabinoids such as cannabigerol at significantly higher yields than conventional methods. Comprehensive descriptions of the methods are disclosed in the detailed description that follows and published in U.S. Pat. Nos. 10,669,248 and 10,822,320, which are incorporated by reference in their entirety.

DETAILED DESCRIPTION

Various aspects of the disclosure relate to a method to chemically-modify a cannabinoid, comprising: providing a composition comprising the cannabinoid, wherein the cannabinoid comprises a carboxyl group, and the cannabinoid is in a liquid phase or a solid phase; contacting the composition with sufficient energy to convert the cannabinoid into carbon dioxide and a modified cannabinoid in a gas phase; contacting the modified cannabinoid with a heat sink to condense the modified cannabinoid into a condensed cannabinoid in a liquid distillate; and collecting the liquid distillate. Cannabinoids that comprise a carboxyl group are either carboxylic acids or carboxylates.

Various aspects of the disclosure relate to a method to purify a cannabinoid from a non-volatile chemical species, comprising: providing a composition comprising the cannabinoid and the non-volatile chemical species, wherein both the cannabinoid and the non-volatile chemical species are in a liquid phase or a solid phase; contacting the composition with sufficient energy to convert the cannabinoid in the liquid phase or the solid phase into a vaporized cannabinoid in a gas phase without vaporizing the non-volatile chemical species; separating the vaporized cannabinoid in the gas phase from the non-volatile chemical species; contacting the vaporized cannabinoid with a heat sink to condense the vaporized cannabinoid into a condensed cannabinoid in a liquid distillate; and collecting the liquid distillate.

U.S. Patent Application Publication No. 2016/0038437 A1 ('437 application) and its international counterparts disclose failed attempts to perform commercially-viable gas-phase decarboxylation and purification. The '437 application states, "The rate of decarboxylation is a product of temperature and time. At 145° C. 95% of cannabinoid acid is decarboxylated in approximately 30 minutes." FIGS. 6-10 of the '437 application show that gas chromatography ("GC") was used to measure cannabinoid decarboxylation, but gas chromatography is known to perform quantitative decarboxylation as evidenced by near-complete decarboxylation of the starting material in FIGS. 6-10. Table 2 and FIGS. 6-10 indicate that the extraction was incomplete because an undisclosed amount of cannabinoids were left behind in the "spent herb." Table 2 also indicates that the method resulted in significant amounts of the cannabinoid oxidation product cannabinol ("CBN") and the thermal degradation product delta8-tetrahydrocannabinol ("Δ8-THC").

The '437 application erred in the presumption that temperature should be optimized to purify and decarboxylate cannabinoids in the gas phase: "It is therefore preferred to use a temperature which is as low as possible in order to minimise thermal-oxidative degradation and thermal isomerisation of Δ9-THC." The instant disclosure teaches that energy transfer should be optimized to purify and decarboxylate cannabinoids in the gas phase. Optimizing energy transfer independently from temperature allows (1) extraction times of about 2 seconds rather than "approximately 30 minutes," (2) actual decarboxylation of greater than 95 percent rather than hypothetical decarboxylation of 95 percent, (3) demonstrable yields of greater than 90 percent rather than yields that are too low to report, and (4) minimal conversion of cannabinoids into cannabinol rather than significant conversion into cannabinol. The instant disclosure also describes a continuous process that improves upon the batch process of the '437 application.

In some embodiments, the sufficient energy is no greater than 100 kilojoules per gram of the composition. In some specific embodiments, the sufficient energy is at least 500 joules and no greater than 100 kilojoules per gram of the composition. In some very specific embodiments, the sufficient energy is at least 2 kilojoules and no greater than 50 kilojoules per gram of the composition.

In some embodiments, the sufficient energy is no greater than 0.04 kilowatt hours per gram of the composition. In some specific embodiments, the sufficient energy is at least 0.0003 and no greater than 0.04 kilowatt hours per gram of the composition. In some very specific embodiments, the sufficient energy is at least 0.0005 and no greater than 0.02 kilowatt hours per gram of the composition.

In some embodiments, the sufficient energy is provided at a rate of no greater than 100 kilowatts of power per gram of the composition for a duration of no greater than 60 seconds. In some specific embodiments, the sufficient energy is provided at a rate of at least 1 kilowatt and no greater than 100 kilowatts of power per gram of the composition for a duration of at least 200 milliseconds and no greater than 20 seconds.

In some embodiments, the composition comprises the cannabinoid at a concentration of at least 0.1 percent by mass. In some specific embodiments, the composition comprises the cannabinoid at a concentration of at least 5 percent by mass. In some very specific embodiments, the composition comprises the cannabinoid at a concentration of at least 10 percent by mass. Higher concentrations of cannabinoids improve energy transfer.

In some embodiments, the composition has a surface-area-to-volume ratio of greater than 100 per meter ($m^{-1}$). In some specific embodiments, the composition has a surface-area-to-volume ratio of greater than 500 per meter. In some very specific embodiments, the composition has a surface-area-to-volume ratio of greater than 1000 per meter. Greater surface-area-to-volume improves energy transfer.

In some embodiments, the method comprises grinding the composition to a surface-area-to-volume ratio of greater than 100 per meter. In some embodiments, the method comprises grinding the composition to a surface-area-to-volume ratio of greater than 100 per meter to produce particles of the composition. In some specific embodiments, the method comprises grinding the composition to a surface-area-to-volume ratio of greater than 500 per meter. In some specific embodiments, the method comprises grinding the composition to a surface-area-to-volume ratio of greater than 500 per meter to produce particles of the composition. In some very specific embodiments, the method comprises grinding the composition to a surface-area-to-volume ratio of greater than 1000 per meter. In some very specific embodiments, the method comprises grinding the composition to a surface-area-to-volume ratio of greater than 1000 per meter to produce particles of the composition. Smaller particle size allows the composition to be suspended in a gas phase, which improves energy transfer.

In some embodiments, the method comprises suspending a particle of the composition in the gas phase. In some specific embodiments, the method comprises suspending a particle of the composition in the gas phase, wherein the particle comprises the cannabinoid. In some very specific embodiments, the method comprises suspending a particle of the composition in the gas phase, wherein the particle comprises the cannabinoid, and the method comprises contacting the cannabinoid with the sufficient energy while the particle is suspended in the gas phase. In some embodiments, the method comprises suspending a droplet of the composition in the gas phase. In some specific embodiments, the method comprises suspending a droplet of the composition in the gas phase, wherein the droplet comprises the cannabinoid. In some very specific embodiments, the method comprises suspending a droplet of the composition in the gas phase, wherein the droplet comprises the cannabinoid, and the method comprises contacting the cannabinoid with the sufficient energy while the droplet is suspended in the gas phase. Suspending a particle or droplet in the gas phase improves energy transfer.

In some embodiments, the method comprises suspending particles of the composition in the gas phase. In some specific embodiments, the method comprises suspending particles of the composition in the gas phase, wherein the particles comprise the cannabinoid. In some very specific embodiments, the method comprises suspending particles of the composition in the gas phase, wherein the particle comprises the cannabinoid, and the method comprises contacting the cannabinoid with the sufficient energy while the particles are suspended in the gas phase. In some embodiments, the method comprises suspending droplets of the composition in the gas phase. In some specific embodiments, the method comprises suspending droplets of the composition in the gas phase, wherein the droplets comprise the cannabinoid. In some very specific embodiments, the method comprises suspending droplets of the composition in the gas phase, wherein the droplets comprise the cannabinoid, and the method comprises contacting the cannabinoid with the sufficient energy while the droplets are suspended in the gas phase. Suspending particles or droplets in the gas phase allows continuous operation.

In some embodiments, the method comprises directing the composition along a heated path having a length of at least 100 millimeters, wherein the composition is contacted with the sufficient energy in the heated path. In some specific embodiments, the method comprises directing the composition along a heated path having a length of at least 1 meter, wherein the composition is contacted with the sufficient energy in the heated path. In some very specific embodiments, the method comprises directing the composition along a heated path having a length of at least 4 meters, wherein the composition is contacted with the sufficient energy in the heated path. Directing the composition along a heated path allows precise control of energy transfer because dwell time in the heated path correlates with energy transfer. Path length correlates with dwell time.

In some embodiments, the method comprises directing particles of the composition along a heated path having a length of at least 100 millimeters, wherein the composition is contacted with the sufficient energy in the heated path. In some specific embodiments, the method comprises directing particles of the composition along a heated path having a length of at least 1 meter, wherein the composition is contacted with the sufficient energy in the heated path. In some very specific embodiments, the method comprises directing particles of the composition along a heated path having a length of at least 4 meters, wherein the composition is contacted with the sufficient energy in the heated path.

In some specific embodiments, the method comprises directing the composition along a heated path at a rate of at least 100 millimeters per minute. In some very specific embodiments, the method comprises directing the composition along a heated path at a rate of at least 2 meters per second. In some embodiments, the method comprises directing the composition along a heated surface. In some specific embodiments, the method comprises directing the composition along a heated surface at a rate of at least 100 millimeters per minute. In some very specific embodiments, the method comprises directing the composition along a heated surface at a rate of at least 2 meters per second. Directing the composition along a heated path allows precise control of energy transfer because dwell time in the heated path correlates with energy transfer. The rate at which the composition travels through the heated path correlates with dwell time.

In some embodiments, the method comprises coating a heated surface with the composition at a surface-area-to-volume ratio of the composition that is greater than 100 per meter. In some specific embodiments, the method comprises coating a heated surface with the composition at a surface-area-to-volume ratio of the composition that is greater than 100 per meter, and the method comprises contacting the cannabinoid with the sufficient energy while the composition is coated on the heated surface. In some specific embodiments, the method comprises coating a heated surface with the composition at a surface-area-to-volume ratio of the composition that is greater than 500 per meter. In some very specific embodiments, the method comprises coating a heated surface with the composition at a surface-area-to-volume ratio of the composition that is greater than 500 per meter, and the method comprises contacting the cannabinoid with the sufficient energy while the composition is coated on the heated surface.

In some embodiments, the method comprises contacting the composition with a heated gas having a temperature of at least 190 and no greater than 250 degrees Celsius. In some specific embodiments, the method comprises contacting the composition with a heated gas having a temperature of at least 205 and no greater than 235 degrees Celsius. In some embodiments, the method comprises contacting the composition with a heated surface having a temperature of at least 190 and no greater than 250 degrees Celsius. In some specific embodiments, the method comprises contacting the composition with a heated surface having a temperature of at least 205 and no greater than 235 degrees Celsius.

In some embodiments, the composition comprises the cannabinoid and a non-volatile chemical species, and the method comprises both separating the modified cannabinoid in the gas phase from the non-volatile chemical species and collecting the non-volatile chemical species. In some specific embodiments, the composition comprises the cannabinoid and a non-volatile chemical species, and the method comprises both separating the modified cannabinoid in the gas phase from the non-volatile chemical species and collecting the non-volatile chemical species, wherein the separating occurs both (a) after converting the cannabinoid into the carbon dioxide and the modified cannabinoid and (b) prior to contacting the modified cannabinoid with the heat sink.

In some embodiments, the composition comprises the cannabinoid and the non-volatile chemical species, and the method comprises both separating the vaporized cannabinoid in the gas phase from the non-volatile chemical species and collecting the non-volatile chemical species, wherein the separating occurs both (a) after converting the cannabinoid into the vaporized cannabinoid and (b) prior to contacting the vaporized cannabinoid with the heat sink.

In some very specific embodiments, the non-volatile chemical species is cellulose. In some very specific embodiments, the non-volatile chemical species is chlorophyll. In some very specific embodiments, the non-volatile chemical species is nucleic acid that comprises one or more nucleotide sequences that encode a geranyl-pyrophosphate-olivetolic acid geranyltransferase. In some very specific embodiments, the non-volatile chemical species is protein that comprises one or more amino acid sequences that encode a geranyl-pyrophosphate-olivetolic acid geranyltransferase.

In some embodiments, the method comprises contacting the modified cannabinoid with the heat sink less than 240 seconds after contacting the composition with the sufficient energy. In some specific embodiments, the method comprises contacting the modified cannabinoid with the heat sink less than 60 seconds after contacting the composition with the sufficient energy. In some very specific embodiments, the method comprises contacting the modified cannabinoid with the heat sink less than 30 seconds after contacting the composition with the sufficient energy. The methods of this disclosure display markedly-improved efficiency relative to conventional decarboxylation, which takes about 30 minutes for boutique production and several hours for production at scale.

In some embodiments, the vaporized cannabinoid is condensed into the condensed cannabinoid less than 240 seconds after the cannabinoid is converted into the vaporized cannabinoid. In some specific embodiments, the vaporized cannabinoid is condensed into the condensed cannabinoid less than 60 seconds after the cannabinoid is converted into the vaporized cannabinoid. In some very specific embodiments, the vaporized cannabinoid is condensed into the condensed cannabinoid less than 30 seconds after the cannabinoid is converted into the vaporized cannabinoid.

In some embodiments, both contacting the composition with the sufficient energy and condensing the modified cannabinoid into the condensed cannabinoid are performed in less than 240 seconds. In some specific embodiments, both contacting the composition with the sufficient energy and condensing the modified cannabinoid into the condensed cannabinoid are performed in less than 60 seconds. In some very specific embodiments, both contacting the composition with the sufficient energy and condensing the modified cannabinoid into the condensed cannabinoid are performed in less than 30 seconds.

In some embodiments, each of (i) contacting the composition with the sufficient energy, (ii) separating the vaporized cannabinoid in the gas phase from the non-volatile chemical species, and (iii) contacting the vaporized cannabinoid with the heat sink are performed in a total time of less than 240 seconds. In some specific embodiments, each of (i) contacting the composition with the sufficient energy, (ii) separating the vaporized cannabinoid in the gas phase from the non-volatile chemical species, and (iii) contacting the vaporized cannabinoid with the heat sink are performed in a total time of less than 60 seconds. In some very specific embodiments, each of (i) contacting the composition with the sufficient energy, (ii) separating the vaporized cannabinoid in the gas phase from the non-volatile chemical species, and (iii) contacting the vaporized cannabinoid with the heat sink are performed in a total time of less than 30 seconds.

In some embodiments, at least 75 percent of the cannabinoid is converted into the condensed cannabinoid per mole. In some specific embodiments, at least 85 percent of the cannabinoid is converted into the condensed cannabinoid per mole. In some very specific embodiments, at least 95 percent of the cannabinoid is converted into the condensed cannabinoid per mole. The yields obtainable by the methods of this disclosure are generally superior to conventional extraction methods performed at scale, for example, because combining purification and decarboxylation minimizes loss.

In some embodiments, the method comprises producing a liquid distillate that comprises the condensed cannabinoid and cannabinol at a molar ratio of greater than 100:1. In some specific embodiments, the method comprises producing a liquid distillate that comprises the condensed cannabinoid and cannabinol at a molar ratio of greater than 200:1. In some specific embodiments, the method comprises producing a liquid distillate that comprises cannabinol at a concentration of no greater than 0.5 percent by mass. In some very specific embodiments, the method comprises producing a liquid distillate that comprises cannabinol at a concentration of no greater than 0.2 percent by mass. Conventional decarboxylation produces the oxidation product cannabinol. The methods of this disclosure minimize oxidation by minimizing decarboxylation time.

In some embodiments, the method comprises producing a product from the liquid distillate, wherein the product comprises the condensed cannabinoid at a concentration of at least 50 percent by mass. In some specific embodiments, the method comprises producing a product from the liquid distillate, wherein the product comprises the condensed cannabinoid at a concentration of at least 55 percent by mass. In some very specific embodiments, the method comprises producing a product from the liquid distillate, wherein the product comprises the condensed cannabinoid at a concentration of at least 60 percent by mass. The methods of this disclosure generally improve purity relative to conventional extraction methods because the methods of this disclosure both distill cannabinoids during decarboxylation and minimize the production of oxidation product and thermal-degradation product impurities.

In some embodiments, the liquid distillate comprises ethanol, and the method comprises evaporating the ethanol to produce a product. In some specific embodiments, the liquid distillate comprises ethanol, and the method comprises evaporating the ethanol to produce a product from the liquid distillate, wherein the product comprises the condensed cannabinoid at a concentration of at least 50 percent by mass. In some very specific embodiments, the liquid distillate comprises ethanol, and the method comprises evaporating the ethanol to produce a product from the liquid distillate, wherein the product comprises the condensed cannabinoid at a concentration of at least 55 percent by mass. In some even more specific embodiments, the liquid distillate comprises ethanol, and the method comprises evaporating the ethanol to produce a product from the liquid distillate, wherein the product comprises the condensed cannabinoid at a concentration of at least 60 percent by mass. Ethanol reduces viscosity to improve the fluid dynamics of the liquid distillate. Improved fluid dynamics allows pumping that enables continuous operation.

In some embodiments, the cannabinoid is cannabidiolic acid (CBDA; 2,4-dihydroxy-3-(6-isopropenyl-3-methylcyclohex-2-enyl)-6-pentylbenzoic acid), and the condensed cannabinoid is cannabidiol (CBD; 2-(6-isopropenyl-3-methylcyclohex-2-enyl)-5-pentylbenzene-1,3-diol). In some embodiments, the cannabinoid is cannabidivarinic acid (CBDVA; 2,4-dihydroxy-3-(6-isopropenyl-3-methylcyclohex-2-enyl)-6-propylbenzoic acid), and the condensed cannabinoid is cannabidivarin (CBDV; 2-(6-isopropenyl-3-methylcyclohex-2-enyl)-5-propylbenzene-1,3-diol). In some embodiments, the cannabinoid is tetrahydrocannabinolic acid (THCA; 1-hydroxy-6,6,9-trimethyl-3-pentyl-6a,7,8,10a-tetrahydro-6H-benzo[c]chromene-2-carboxylic acid), and the condensed cannabinoid is tetrahydrocannabinol (THC; 6,6,9-trimethyl-3-pentyl-6a,7,8,10a-tetrahydro-6H-benzo[c]chromen-1-ol). In some embodiments, the cannabinoid is tetrahydrocannabivarinic acid (THCVA; 1-hydroxy-6,6,9-trimethyl-3-propyl-6a,7,8,10a-tetrahydro-6H-benzo[c]chromene-2-carboxylic acid), and the condensed cannabinoid is tetrahydrocannabivarin (THC; 6,6,9-trimethyl-3-propyl-6a,7,8,10a-tetrahydro-6H-benzo[c]chromen-1-ol). In some embodiments, the cannabinoid is cannabigerolic acid (CBGA; 3-geranyl-2,4-dihydroxy-6-pentylbenzoic acid), and the condensed cannabinoid is cannabigerol (CBG; 2-geranyl-5-pentylbenzene-1,3-diol). In some embodiments, the cannabinoid is cannabigerovarinic acid (CBGVA; 3-geranyl-2,4-dihydroxy-6-propylbenzoic acid), and the condensed cannabinoid is cannabigerovarin (CBGV; 2-geranyl-5-propylbenzene-1,3-diol).

In some embodiments, the cannabinoid is cannabidiolic acid, and the modified cannabinoid and the condensed cannabinoid are both cannabidiol. In some embodiments, the cannabinoid is cannabidivarinic acid, and the modified cannabinoid and the condensed cannabinoid are both cannabidivarin. In some embodiments, the cannabinoid is tetrahydrocannabinolic acid, and the modified cannabinoid and the condensed cannabinoid are both tetrahydrocannabinol. In some embodiments, the cannabinoid is tetrahydrocannabivarinic acid, and the modified cannabinoid and the condensed cannabinoid are both tetrahydrocannabivarin. In some embodiments, the cannabinoid is cannabigerolic acid, and the modified cannabinoid and the condensed cannabinoid are both cannabigerol. In some embodiments, the cannabinoid is cannabigerovarinic acid, and the modified cannabinoid and the condensed cannabinoid are both cannabigerovarin.

In some embodiments, the cannabinoid is cannabidiolic acid, and the vaporized cannabinoid and the condensed cannabinoid are both cannabidiol. In some embodiments, the cannabinoid is cannabidivarinic acid, and the vaporized cannabinoid and the condensed cannabinoid are both cannabidivarin. In some embodiments, the cannabinoid is tetrahydrocannabinolic acid, and the vaporized cannabinoid and the condensed cannabinoid are both tetrahydrocannabinol. In some embodiments, the cannabinoid is tetrahydrocannabivarinic acid, and the vaporized cannabinoid and the condensed cannabinoid are both tetrahydrocannabivarin. In some embodiments, the cannabinoid is cannabigerolic acid, and the vaporized cannabinoid and the condensed cannabinoid are both cannabigerol. In some embodiments, the cannabinoid is cannabigerovarinic acid, and the vaporized cannabinoid and the condensed cannabinoid are both cannabigerovarin. In some embodiments, the cannabinoid, the vaporized cannabinoid, and the condensed cannabinoid are each cannabidiol. In some embodiments, the cannabinoid, the vaporized cannabinoid, and the condensed cannabinoid are each cannabidivarin. In some embodiments, the cannabinoid, the vaporized cannabinoid, and the condensed cannabinoid are each tetrahydrocannabinol. In some embodiments, the cannabinoid, the vaporized cannabinoid, and the condensed cannabinoid are each tetrahydrocannabivarin. In some embodiments, the cannabinoid, the vaporized cannabinoid, and the condensed cannabinoid are each cannabigerol. In some embodiments, the cannabinoid, the vaporized cannabinoid, and the condensed cannabinoid are each cannabigerovarin.

In some embodiments, the sufficient energy is sufficient to maintain an average reaction rate for the conversion of the cannabinoid into the modified cannabinoid over a period of time; the modified cannabinoid is condensed at an average condensation rate for the condensation of the modified cannabinoid into the condensed cannabinoid over a concurrent period of time; the average condensation rate is no less than 50 percent of the average reaction rate; the average reaction rate is no less than 50 percent of the average condensation rate; the period of time and the concurrent period of time are chronologically identical; and the period of time and the concurrent period of time are at least 200 milliseconds and no greater than 5 minutes. In some specific embodiments, the sufficient energy is sufficient to maintain an average reaction rate for the conversion of the cannabinoid into the modified cannabinoid over a period of time; the modified cannabinoid is condensed at an average condensation rate for the condensation of the modified cannabinoid into the condensed cannabinoid over a concurrent period of time; the average condensation rate is no less than 50 percent of the average reaction rate; the average reaction rate is no less than 50 percent of the average condensation rate; the period of time and the concurrent period of time are chronologically identical; and the period of time and the concurrent period of time are at least 200 milliseconds and no greater than 240 seconds. Harmonizing reaction rate with condensation rate allows continuous operation.

In some embodiments, the sufficient energy is sufficient to maintain an average vaporization rate for the conversion of the cannabinoid into the vaporized cannabinoid over a period of time; the vaporized cannabinoid is condensed into the condensed cannabinoid at an average condensation rate for the condensation of the vaporized cannabinoid into the condensed cannabinoid over a concurrent period of time; the average condensation rate is no less than 50 percent of the vaporization rate; the average vaporization rate is no less than 50 percent of the average condensation rate; the period of time and the concurrent period of time are chronologically identical; and the period of time and the concurrent period of time are at least 200 milliseconds and no greater than 5 minutes. In some specific embodiments, the sufficient energy is sufficient to maintain an average vaporization rate for the conversion of the cannabinoid into the vaporized cannabinoid over a period of time; the vaporized cannabinoid is condensed into the condensed cannabinoid at an average condensation rate for the condensation of the vaporized cannabinoid into the condensed cannabinoid over a concurrent period of time; the average condensation rate is no less than 50 percent of the vaporization rate; the average vaporization rate is no less than 50 percent of the average condensation rate; the period of time and the concurrent period of time are chronologically identical; and the period of time and the concurrent period of time are at least 200 milliseconds and no greater than 240 seconds. Harmonizing vaporization rate with condensation rate allows continuous operation.

Example. Purification and Decarboxylation of Cannabinoids from USDA Organic Industrial Hemp The methods described in the detailed description were performed on 25 tons of USDA organic industrial hemp to produce USDA organic certified hemp extracts that are sold online and in natural product grocers throughout the United States. Third party ISO/IEC 17025 accredited cannabinoid testing laboratories were engaged to measure cannabinoid concentrations in the raw plant material, extracted plant material, and extract to support regulatory compliance, quality control, and valuation of the input and outputs. Measurements obtained on two different lots of the 25-ton production run are set forth in Tables 1 and 2. These measurements are disclosed for exemplary purposes, and they do not limit the scope of the disclosure or any claim that matures from this patent document.

TABLE 1

Gas-Phase Purification and Decarboxylation of Cannabinoids from USDA Organic Industrial Hemp in a 2-Second Process with Measurements Performed by Third Party ISO/IEC 17025 Accredited Cannabinoid-Testing Laboratories

|  | Raw Plant Material | | Extracted Plant Material | | Extract | |
| --- | --- | --- | --- | --- | --- | --- |
|  | Percent by Mass | Percent by Cannabinoid Content | Percent by Mass | Percent by Cannabinoid Content | Percent by Mass | Percent by Cannabinoid Content |
| CBDA | 6.60% | 86.5% | 0.00% | 0.00% | 0.92% | 1.33% |
| CBD | 0.26% | 3.41% | 0.46% | 100% | 60.9% | 88.2% |
| THCA | 0.18% | 2.36% | 0.00% | 0.00% | 0.00% | 0.00% |
| THC | 0.00% | 0.00% | 0.00% | 0.00% | 1.95% | 2.82% |
| CBGA | 0.18% | 2.36% | * | * | 0.00% | 0.00% |
| CBG | 0.00% | 0.00% | * | * | 1.40% | 2.03% |
| CBCA | 0.41% | 5.37% | * | * | 0.00% | 0.00% |
| CBC | 0.00% | 0.00% | * | * | 3.91% | 5.66% |
| CBNA | 0.00% | 0.00% | * | * | 0.00% | 0.00% |
| CBN | 0.00% | 0.00% | * | * | 0.00% | 0.00% |
| Δ8THC | 0.00% | 0.00% | * | * | 0.00% | 0.00% |
| Total | 7.63% | 100% | 0.46% | 100% | 69.0% | 100% |

94.1% CBD Extraction Yield
98.3% CBD Decarboxylation Efficiency
100% THC Extraction Yield
100% THC Decarboxylation Efficiency
CBDA = cannabidiolic acid
CBCA = cannabichromenic acid
CBD = cannabidiol
CBC = cannabichromene
THCA = tetrahydrocannabinolic acid
CBNA = cannabinolic acid
THC = tetrahydrocannabinol
CBN = cannabinol
CBGA = cannabigerolic acid
Δ8THC = delta8-tetrahydrocannabinol
CBG = cannabigerol
* = not tested

TABLE 2

Gas-Phase Purification and Decarboxylation of Cannabinoids from USDA Organic Industrial Hemp in a 2-Second Process with Measurements Performed by Third Party ISO/IEC 17025 Accredited Cannabinoid-Testing Laboratories

| | Raw Plant Material | | Extracted Plant Material | | Extract | |
|---|---|---|---|---|---|---|
| | Percent by Mass | Percent by Cannabinoid Content | Percent by Mass | Percent by Cannabinoid Content | Percent by Mass | Percent by Cannabinoid Content |
| CBDA | 6.44% | 85.4% | 0.00% | 0.00% | 0.32% | 0.41% |
| CBD | 0.11% | 1.46% | 1.00% | 100% | 69.9% | 89.9% |
| THCA | 0.30% | 3.98% | 0.00% | 0.00% | 0.00% | 0.00% |
| THC | 0.00% | 0.00% | 0.00% | 0.00% | 2.33% | 3.00% |
| CBGA | 0.27% | 3.58% | 0.00% | 0.00% | 0.00% | 0.00% |
| CBG | 0.00% | 0.00% | 0.00% | 0.00% | 1.37% | 1.76% |
| CBCA | 0.42% | 5.57% | 0.00% | 0.00% | 0.00% | 0.00% |
| CBC | 0.00% | 0.00% | 0.00% | 0.00% | 3.61% | 4.65% |
| CBNA | 0.00% | 0.00% | 0.00% | 0.00% | 0.00% | 0.00% |
| CBN | 0.00% | 0.00% | 0.00% | 0.00% | 0.19% | 0.24% |
| Δ8THC | 0.00% | 0.00% | 0.00% | 0.00% | 0.00% | 0.00% |
| Total | 7.54% | 100% | 1.00% | 100% | 77.7% | 100% |

86.6% CBD Extraction Yield
99.5% CBD Decarboxylation Efficiency
100% THC Extraction Yield
100% THC Decarboxylation Efficiency
CBDA = cannabidiolic acid
CBCA = cannabichromenic acid
CBD = cannabidiol
CBC = cannabichromene
THCA = tetrahydrocannabinolic acid
CBNA = cannabinolic acid
THC = tetrahydrocannabinol
CBN = cannabinol
CBGA = cannabigerolic acid
Δ8THC = delta8-tetrahydrocannabinol
CBG = cannabigerol

What is claimed is:

1. A method to chemically-modify a cannabinoid, comprising:
providing a composition comprising the cannabinoid, wherein the cannabinoid comprises a carboxyl group, the carboxyl group is a carboxylic acid, the cannabinoid is tetrahydrocannabinolic acid (THCA; 1-hydroxy-6,6,9-trimethyl-3-pentyl-6a,7,8,10a-tetrahydro-6H-benzo[c]chromene-2-carboxylic acid), the composition comprises the cannabinoid at a concentration of at least 0.1 percent by mass, and the cannabinoid is in a liquid phase;
coating a heated surface with the composition at a surface-area-to-volume ratio of the composition that is greater than 100 per meter;
directing the composition along a heated path;
contacting the composition with sufficient energy to convert the cannabinoid into carbon dioxide and a modified cannabinoid in a gas phase, wherein the composition is contacted with the sufficient energy in the heated path, and the modified cannabinoid is tetrahydrocannabinol (THC; 6,6,9-trimethyl-3-pentyl-6a,7,8,10a-tetrahydro-6H-benzo[c]chromen-1-ol);
condensing the modified cannabinoid into a condensed cannabinoid in a liquid distillate, wherein the condensed cannabinoid is tetrahydrocannabinol (THC; 6,6,9-trimethyl-3-pentyl-6a,7,8,10a-tetrahydro-6H-benzo[c]chromen-1-ol); and
collecting the liquid distillate.

2. The method of claim 1, wherein:
the method comprises converting at least 85 percent of the cannabinoid into the condensed cannabinoid per mole;
the method is performed such that the liquid distillate comprises cannabinol at a concentration of no greater than 0.5 percent by mass; and
the method comprises producing a product from the liquid distillate, wherein the product comprises the condensed cannabinoid at a concentration of at least 60 percent by mass.

3. The method of claim 1, wherein the sufficient energy is at least 500 joules and no greater than 100 kilojoules per gram of the composition.

4. The method of claim 1, wherein the sufficient energy is no greater than 50 kilojoules per gram of the composition.

5. The method of claim 1, wherein the composition comprises the cannabinoid at a concentration of at least 5 percent by mass.

6. The method of claim 1, wherein the heated path has a length of at least 100 millimeters.

7. The method of claim 1, comprising contacting the modified cannabinoid with a heat sink to condense the modified cannabinoid into a condensed cannabinoid in a liquid distillate less than 240 seconds after contacting the composition with the sufficient energy.

8. The method of claim 1, comprising converting at least 85 percent of the cannabinoid into the condensed cannabinoid per mole.

9. The method of claim 1, wherein the liquid distillate comprises the condensed cannabinoid and cannabinol at a molar ratio of greater than 100:1.

10. The method of claim 1, wherein the liquid distillate comprises cannabinol at a concentration of no greater than 0.5 percent by mass.

11. The method of claim 1, comprising producing a product from the liquid distillate, wherein the product comprises the condensed cannabinoid at a concentration of at least 60 percent by mass.

12. A method to chemically-modify a cannabinoid, comprising:
provide a composition comprising the cannabinoid, wherein the cannabinoid comprises a carboxyl group, the carboxyl group is a carboxylic acid, the cannabinoid is tetrahydrocannabinolic acid (THCA; 1-hydroxy-6,6,9-trimethyl-3-pentyl-6a,7,8,10a-tetrahydro-6H-benzo[c]chromene-2-carboxylic acid), the composition comprises the cannabinoid at a concentration of at least 0.1 percent by mass, and the cannabinoid is in a liquid phase;

coating a heated surface with the composition at a surface-area-to-volume ratio of the composition that is greater than 100 per meter;

directing the composition along a heated path having a length of at least 100 millimeters;

contacting the composition with sufficient energy to convert the cannabinoid into carbon dioxide and a modified cannabinoid in a gas phase, wherein the composition is contacted with the sufficient energy in the heated path, and the modified cannabinoid is tetrahydrocannabinol (THC; 6,6,9-trimethyl-3-pentyl-6a,7,8,10a-tetrahydro-6H-benzo[c]chromen-1-ol);

condensing the modified cannabinoid into a condensed cannabinoid in a liquid distillate, wherein the condensed cannabinoid is tetrahydrocannabinol (THC; 6,6,9-trimethyl-3-pentyl-6a,7,8,10a-tetrahydro-6H-benzo[c]chromen-1-ol); and collecting the liquid distillate,
wherein:
the sufficient energy is sufficient to maintain an average reaction rate for the conversion of the cannabinoid into the modified cannabinoid over a period of time;
the modified cannabinoid is condensed at an average condensation rate for the condensation of the modified cannabinoid into the condensed cannabinoid over a concurrent period of time;
the average reaction rate is no less than 50 percent of the average condensation rate;
the period of time and the concurrent period of time are chronologically identical; and
the period of time and the concurrent period of time are at least 200 milliseconds and no greater than 5 minutes.

13. The method of claim 12, wherein the sufficient energy is at least 500 joules and no greater than 100 kilojoules per gram of the composition.

14. The method of claim 12, wherein the sufficient energy is no greater than 50 kilojoules per gram of the composition.

15. The method of claim 12, wherein the composition comprises the cannabinoid at a concentration of at least 5 percent by mass.

16. The method of claim 12, comprising directing the composition along the heated path at a rate of at least 100 millimeters per minute.

17. The method of claim 12, comprising contacting the modified cannabinoid with a heat sink to condense the modified cannabinoid into a condensed cannabinoid in a liquid distillate less than 240 seconds after contacting the composition with the sufficient energy.

18. The method of claim 12, comprising converting at least 85 percent of the cannabinoid into the condensed cannabinoid per mole.

19. The method of claim 12, wherein the liquid distillate comprises the condensed cannabinoid and cannabinol at a molar ratio of greater than 100:1.

20. The method of claim 12, wherein the liquid distillate comprises cannabinol at a concentration of no greater than 0.5 percent by mass.

21. The method of claim 12, comprising producing a product from the liquid distillate, wherein the product comprises the condensed cannabinoid at a concentration of at least 60 percent by mass.

22. A method to chemically-modify a cannabinoid, comprising:
providing a composition comprising the cannabinoid, wherein the cannabinoid comprises a carboxyl group, the carboxyl group is a carboxylic acid, the cannabinoid is tetrahydrocannabinolic acid (THCA; 1-hydroxy-6,6,9-trimethyl-3-pentyl-6a,7,8,10a-tetrahydro-6H-benzo[c]chromene-2-carboxylic acid), the composition comprises the cannabinoid at a concentration of at least 0.1 percent by mass, and the cannabinoid is in a liquid phase;

coating a heated surface with the composition at a surface-area-to-volume ratio of the composition that is greater than 100 per meter;

directing the composition along a heated path having a length of at least 100 millimeters;

contacting the composition with sufficient energy to convert the cannabinoid into carbon dioxide and a modified cannabinoid in a gas phase, wherein the composition is contacted with the sufficient energy in the heated path, and the modified cannabinoid is tetrahydrocannabinol (THC; 6,6,9-trimethyl-3-pentyl-6a,7,8,10a-tetrahydro-6H-benzo[c]chromen-1-ol);

condensing the modified cannabinoid into a condensed cannabinoid in a liquid distillate, wherein the condensed cannabinoid is tetrahydrocannabinol (THC; 6,6,9-trimethyl-3-pentyl-6a,7,8,10a-tetrahydro-6H-benzo[c]chromen-1-ol); and collecting the liquid distillate,
wherein:
the method is performed such that the liquid distillate comprises the condensed cannabinoid and cannabinol at a molar ratio of greater than 100:1; and
the method comprises producing a product from the liquid distillate, wherein the product comprises the condensed cannabinoid at a concentration of at least 60 percent by mass.

* * * * *